United States Patent
Daimler et al.

(10) Patent No.: US 12,253,984 B2
(45) Date of Patent: Mar. 18, 2025

(54) DATA MIGRATION BY QUERY CO-EVALUATION

(71) Applicant: Conexus ai, Inc., San Francisco, CA (US)

(72) Inventors: Eric Alexander Daimler, San Francisco, CA (US); Ryan Jacob Wisnesky, San Francisco, CA (US)

(73) Assignee: Conexus ai, Inc., San Francisco, CA (US)

( * ) Notice: Subject to any disclaimer, the term of this patent is extended or adjusted under 35 U.S.C. 154(b) by 326 days.

(21) Appl. No.: 17/385,219

(22) Filed: Jul. 26, 2021

(65) Prior Publication Data
US 2023/0031659 A1    Feb. 2, 2023

(51) Int. Cl.
G06F 16/21 (2019.01)
G06F 11/34 (2006.01)
G06F 16/242 (2019.01)
G06F 16/2452 (2019.01)

(52) U.S. Cl.
CPC ........ G06F 16/214 (2019.01); G06F 11/3409 (2013.01); G06F 16/2433 (2019.01); G06F 16/24526 (2019.01)

(58) Field of Classification Search
CPC ............... G06F 16/214; G06F 11/3409; G06F 16/2433; G06F 16/24526; G06F 16/24534; G06F 16/24547; G06F 16/254; G06F 16/258; G06F 16/284; G06F 16/289
See application file for complete search history.

(56) References Cited

U.S. PATENT DOCUMENTS

| | | | | |
|---|---|---|---|---|
| 7,653,652 | B2 * | 1/2010 | Kagalwala | G06F 16/211 707/999.103 |
| 8,037,108 | B1 * | 10/2011 | Chang | G06F 16/214 707/803 |
| 2006/0004774 | A1 | 1/2006 | Alcorn | |
| 2006/0184561 | A1 * | 8/2006 | Terada | G06F 16/214 707/999.102 |
| 2007/0022107 | A1 * | 1/2007 | Yuan | G06F 16/36 |
| 2009/0063435 | A1 | 3/2009 | Ebersole | |
| 2009/0138498 | A1 * | 5/2009 | Krishnamoorthy | G06F 16/2452 |
| 2010/0211939 | A1 | 8/2010 | Ali | |
| 2011/0225167 | A1 * | 9/2011 | Bhattacharjee | G06F 16/284 711/E12.001 |
| 2014/0156633 | A1 * | 6/2014 | Duan | G06F 16/9024 707/713 |
| 2014/0201234 | A1 * | 7/2014 | Lee | G06F 16/9024 707/769 |
| 2015/0248403 | A1 * | 9/2015 | Pazdziora | G06F 16/214 707/809 |
| 2017/0192910 | A1 | 7/2017 | Wright | |
| 2018/0011903 | A1 * | 1/2018 | Abolhassani | G06F 16/24526 |

(Continued)

*Primary Examiner* — Sanjiv Shah
*Assistant Examiner* — Kweku William Halm
(74) *Attorney, Agent, or Firm* — Van Pelt, Yi & James LLP (57) ABSTRACT

Techniques are disclosed to migrate data via query co-evaluation. In various embodiments, an input data associated with a source database S and a target schema T to which the input data is to be migrated is received. A set of relational conjunctive queries from target schema T to source database S is received. Query co-evaluation is performed on the received set of relational conjunctive queries to transition data from source database S to target schema T.

20 Claims, 10 Drawing Sheets

(56) References Cited

U.S. PATENT DOCUMENTS

| | | | |
|---|---|---|---|
| 2019/0050480 A1* | 2/2019 | Courter | H04L 63/102 |
| 2019/0311003 A1* | 10/2019 | Tonkin | G06F 16/353 |
| 2021/0034598 A1* | 2/2021 | Arye | G06F 16/288 |

* cited by examiner

| name | age |
|---|---|
| Alice | 20 |
| Bob | 30 |

➡

| row | name | age |
|---|---|---|
| a | Alice | 20 |
| b | Bob | 30 |

FIG. 5A

| Output Row | subject | predicate | object |
|---|---|---|---|
| $(a, r)$ | ?1 | rdfs:type | foaf:person |
| $(b, r)$ | ?2 | rdfs:type | foaf:person |
| $(a, r_1)$ | ?1 | foaf:name | Alice |
| $(b, r_1)$ | ?2 | foaf:name | Bob |
| $(a, r_2)$ | ?1 | foaf:age | 20 |
| $(b, r_2)$ | ?2 | foaf:age | 30 |

FIG. 5B

| Round-trip | name | age |
|---|---|---|
| $r \mapsto (a, r), r_1 \mapsto (a, r_1), r_2 \mapsto (a, r_2)$ | Alice | 20 |
| $r \mapsto (b, r), r_1 \mapsto (b, r_1), r_2 \mapsto (b, r_2)$ | Bob | 30 |

FIG. 5C

| row | Round-trip |
|---|---|
| a | $r \mapsto (a, r), r_1 \mapsto (a, r_1), r_2 \mapsto (a, r_2)$ |
| b | $r \mapsto (b, r), r_1 \mapsto (b, r_1), r_2 \mapsto (b, r_2)$ |

FIG. 5D

| Row ^ | AmountA | AmountB | CurrencyA | CurrencyB | Effective_Date | Fixed_RateA | Fixed_RateB | PayerA | PayerB | Termination_Date |
|---|---|---|---|---|---|---|---|---|---|---|
| Row_1 | 4504500 | 630000 | YuanRenminbi | USDollar | 2/5/16 | 4.60 | 4.90 | 549300SYBY6... | 213800EZZTAFCTFLFO44 | 8/15/21 |

FIG. 6A

SELECT    r5 . object AS PayerA,      t5 . object AS PayerB,
          u3 . object AS Effective_Date,    v3 . object AS Termination_Date,
          w3 . object AS CurrencyA,       s3 . object AS Amount A,
          x3 . object AS Fixed_RateA,      c3 . object AS CurrencyB,
          a3 . object AS AmountB,        b3 . object AS Fixed_RateB FROM R AS r1, R AS r2, R AS r3, R AS r4, R AS r5,
        R AS t1, R AS t2, R AS t3, R AS t4, R AS t5,
        R AS u2, R AS u3, R AS v2, R AS v3, R AS w2, R AS w3, R AS x2, R AS x3,
        R AS a1, R AS a3, R AS b2, R AS b3, R AS c2, R AS c3, R AS s2, R AS s3 AS R WHERE
r1 . predicate = "...hasLeg" AND    r1 . object = r2 . subject AND
r2 . predicate = "...hasPayingParty" AND    r2 . object = r3 . subject AND
r3 . predicate = "...hasIdentity" AND    r3 . object = r4 . subject AND
r4 . predicate = "...isIdentifiedBy" AND    r4 . object = r5 . subject AND
r5 . predicate = "...hasTag" AND    r5 . subject = r1 . subject AND
t1 . predicate = "...hasLeg" AND    t1 . object = t2 . subject AND
t2 . predicate = "...hasPayingParty" AND    t2 . object = t3 . subject AND
t3 . predicate = "...hasIdentity" AND    t3 . object = t4 . subject AND
t4 . predicate = "...isIdentifiedBy" AND    t4 . object = t5 . subject AND
t5 . predicate = "...hasTag" AND
u2 . subject = r2 . subject AND    u2 . predicate = "...hasEffectiveDate" AND
u2 . object = u3 . subject AND    u3 . predicate = "...hasDateValue" AND
v2 . subject = r2 . subject AND    v2 . predicate = "...hasTerminationDate" AND
v2 . object = v3 . subject AND    v3 . predicate = "...hasDateValue" AND
w2 . subject = r2 . subject AND    w2 . predicate = "...hasNotationalAmount" AND
w2 . object = w3 . subject AND    w3 . predicate = "...hasAmount" AND
x2 . subject = r2 . subject AND    x2 . predicate = "...hasInterestRtae" AND
x2 . object = x3 . subject AND    x3 . predicate = "...hasRateValue" AND
a2 . subject = t2 . subject AND    a2 . predicate = "...hasNotationalAmount" AND
a2 . object = a3 . subject AND    a3 . predicate = "...hasAmount" AND
b2 . subject = t2 . subject AND    b2 . predicate = "...hasInterestRtae" AND
b2 . object = b3 . subject AND    b3 . predicate = "...hasRateValue" AND
c2 . subject = t2 . subject AND    c2 . predicate = "...hasCurrency" AND
c2 . object = c3 . subject AND    c3 . predicate = "...hasAmount" AND
s2 . subject = r2 . subject AND    s2 . predicate = "...hasCurrency" AND
s2 . object = s3 . subject AND    s3 . predicate = "...hasAmount"

| Row | subject | predicate | object |
|---|---|---|---|
| 0 | ?0 | https://spec.edmcouncil.org/fibo/ontology/DER/DerivativesContracts/Swaps/hasCurrency | USDollar |
| 8 | ?0 | https://spec.edmcouncil.org/fibo/ontology/DER/DerivativesContracts/Swaps/hasPayingParty | ?6 |
| 20 | ?0 | https://spec.edmcouncil.org/fibo/ontology/DER/DerivativesContracts/Swaps/hasNotationalAmount | ?13 |
| 22 | ?0 | https://spec.edmcouncil.org/fibo/ontology/DER/DerivativesContracts/Swaps/hasInterestRate | ?14 |
| 1 | ?1 | https://spec.edmcouncil.org/fibo/ontology/DER/DerivativesContracts/Swaps/hasCurrency | YuanRenminbi |
| 4 | ?1 | https://spec.edmcouncil.org/fibo/ontology/DER/DerivativesContracts/Swaps/hasPayingParty | ?3 |
| 12 | ?1 | https://spec.edmcouncil.org/fibo/ontology/DER/DerivativesContracts/Swaps/hasEffectiveDate | ?9 |
| 14 | ?1 | https://spec.edmcouncil.org/fibo/ontology/DER/DerivativesContracts/Swaps/hasTerminationDate | ?10 |
| 16 | ?1 | https://spec.edmcouncil.org/fibo/ontology/DER/DerivativesContracts/Swaps/hasNotationalAmount | ?11 |
| 18 | ?1 | https://spec.edmcouncil.org/fibo/ontology/DER/DerivativesContracts/Swaps/hasInterestRate | ?12 |
| 2 | ?1 | https://spec.edmcouncil.org/fibo/ontology/DER/DerivativesContracts/Swaps/hasLeg | ?1 |
| 3 | ?2 | https://spec.edmcouncil.org/fibo/ontology/DER/DerivativesContracts/Swaps/hasLeg | ?0 |
| 5 | ?3 | https://spec.edmcouncil.org/fibo/ontology/DER/DerivativesContracts/Swaps/hasIdentity | ?4 |
| 6 | ?4 | https://spec.edmcouncil.org/fibo/ontology/DER/DerivativesContracts/Swaps/hasIdentifiedBy | ?5 |
| 7 | ?5 | https://spec.edmcouncil.org/fibo/ontology/DER/DerivativesContracts/Swaps/hasTag | 549300SYBY6EJPNEBV76 |
| 9 | ?6 | https://spec.edmcouncil.org/fibo/ontology/DER/DerivativesContracts/Swaps/hasIdentity | ?7 |
| 10 | ?7 | https://spec.edmcouncil.org/fibo/ontology/DER/DerivativesContracts/Swaps/hasIdentifiedBy | ?8 |
| 11 | ?8 | https://spec.edmcouncil.org/fibo/ontology/DER/DerivativesContracts/Swaps/hasTag | 213800EZZTAFCTFLFO44 |
| 13 | ?9 | https://spec.edmcouncil.org/fibo/ontology/DER/DerivativesContracts/Swaps/hasDateValue | 2/15/16 |
| 15 | ?10 | https://spec.edmcouncil.org/fibo/ontology/DER/DerivativesContracts/Swaps/hasDateValue | 8/15/21 |
| 17 | ?11 | https://spec.edmcouncil.org/fibo/ontology/DER/DerivativesContracts/Swaps/hasAmount | 4504500 |
| 19 | ?12 | https://spec.edmcouncil.org/fibo/ontology/DER/DerivativesContracts/Swaps/hasDateValue | 4.60 |
| 21 | ?13 | https://spec.edmcouncil.org/fibo/ontology/DER/DerivativesContracts/Swaps/hasAmount | 630000 |
| 23 | ?14 | https://spec.edmcouncil.org/fibo/ontology/DER/DerivativesContracts/Swaps/hasRateValue | 4.90 |

FIG. 6C

Row (2)

| Row | AmountA | AmountB | CurrencyA | CurrencyB | Effective_Date | Fixed_RateA | Fixed_RateB | PayerA | PayerB | Termination_Date |
|---|---|---|---|---|---|---|---|---|---|---|
| 0 | 4504500 | 4504500 | YuanRenminbi | USDollar | 2/5/16 | 4.60 | 4.60 | 549300SYBY6EJP... | 549300SYBY6EJP... | 8/15/21 |
| 1 | 4504500 | 630000 | YuanRenminbi | USDollar | 2/5/16 | 4.60 | 4.90 | 549300SYBY6EJP... | 213800EZZTAFCT... | 8/15/21 |

FIG. 6D

Ontology

Data

```
FROM
  Rdf AS Swap
WHERE
  Swap.predicate = isA AND Swap.object = Cross Currency Interest Rate Swap
```

FIG. 9A

```
FROM
  Rdf AS Swap,
  Rdf AS HasLeg0
WHERE
  Swap.predicate = isA AND Swap.object = Cross Currency Interest Rate Swap AND
  HasLeg0.predicate = HasLeg AND HasLeg0.subject = Swap.Object
```

FIG. 9B

```
SELECT HasTag.object AS HasTag
FROM
  Rdf AS Swap ,
  Rdf AS HasLeg0 ,
  Rdf AS HasPayingParty ,
  Rdf AS HasIdentity ,
  Rdf AS IsIdentifiedBy ,
  Rdf AS HasTag
WHERE
  Swap.predicate = "isA" AND Swap.object = CrossCurrencyInterestRateSwap AND
  HasLeg0.predicate = "HasLeg" AND HasLeg0.subject = Swap.Object AND
  HasPayingParty.object=HasLeg.subject AND HasPayingParty.Predicate="HasPayingParty" AND
  HasIdentity.subject=HasPayingParty.object AND HasIdentity.predicate = "HasIdentity" AND
  IsIdentifiedBy.subject=HasIdentity.object AND IsIdentifiedBy.predicate="IsIdentifiedBy" AND
  HasTag.subject=IsIdentifiedBy.Object AND HasTag.predicate="HasTag"
```

FIG. 9C

```
SELECT HasTag.subject AS HasTag, HasEffectiveDate.subject AS HasEffectiveDate
FROM
    Rdf AS Swap,
    Rdf AS HasLeg0,
    Rdf AS HasPayingParty,
    Rdf AS HasIdentity,
    Rdf AS IsIdentifiedBy,
    Rdf AS HasTag,
    Rdf AS HasEffectiveDate,
WHERE
    Swap.predicate = "isA" AND Swap.object = CrossCurrencyInterestRateSwap AND
    HasLeg0.predicate = "HasLeg" AND HasLeg0.subject = Swap.Object AND
    HasPayingParty.object=HasLeg0.subject AND HasPayingParty.Predicate="HasPayingParty" AND
    HasIdentity.subject=HasPayingParty.object AND HasIdentity.predicate = "HasIdentity" AND
    IsIdentifiedBy.subject=HasIdentity.object AND IsIdentifiedBy.predicate="IsIdentifiedBy" AND
    HasTag.subject=IsIdentifiedBy.Object AND HasTag.predicate=HasTag" AND
    HasEffectiveDate.object=HasLeg0.subject AND HasEffectiveDate.Predicate="HasEffectiveDate"
```

FIG. 9D

DATA MIGRATION BY QUERY CO-EVALUATION

BACKGROUND OF THE INVENTION

Data migration, also known as data exchange and closely associated with data integration, is a perennial topic in computer science, with a large body of existing results and techniques that can be used in practical applications. The dominant approach to both data migration and integration uses techniques from formal logic and model theory to specify declarative "schema mapping" formulae relating source and target relational databases. This approach is epitomized by extract, transform, and load (ETL) tools such as Informatica™ Altova MapForce™, IBM DataStage™, Ab Initio™, and more, which translate the schema mappings into executable code (perhaps for a big-data engine such as Spark™). In this approach, graph data models such as Resource Description Framework (RDF) are handled by encoding graphs as their edge relations and nested data models such as extensible markup language (XML) are handled either by shredding or a higher-order logic.

Although the burden of writing (or discovering) schema mappings is generally considered to be low in the literature, presumably due to their declarative character, in data migration practice schema mappings are not a substitute for queries when it comes to communicating with a typical programmer, since query languages such as Structured Query Language (SQL). may simply be more widely used (and better understood) than mapping formalisms or ETL tools by such a programmer.

BRIEF DESCRIPTION OF THE DRAWINGS

Various embodiments of the invention are disclosed in the following detailed description and the accompanying drawings.

FIG. 6A illustrates a single row of input payer/payee data on a single table, as shown for example in the CQL tool.

FIG. 6B illustrates an example of a relational conjunctive (select-from-where) query to construct a set of RDF triples from FIBO.

FIG. 6C shows a set of RDF triples constructed from FIBO via query co-evaluation as disclosed herein.

FIG. 6D illustrates a result of round-tripping the data shown in FIG. 6A.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to migrate data at least in part by query co-evaluation.

In various embodiments, techniques disclosed herein are used to migrate relational data to an RDF database that avoids schema mapping and instead relies on a set of programmer-provided relational queries which define how to project RDF data from the relational data; these queries are then evaluated (run; executed) "in reverse" in a practical application of a new algorithm obtained by instantiating results from a branch of mathematics known as category theory. Although the migrated RDF data will not always be perfectly recoverable by the provided queries, the migrated data will always be "round-trippable" by the provided queries, allowing the information change (gain or loss) involved in the relational to RDF translation to be quantified.

The relational to RDF migration technique disclosed herein is generalized to take into account a lightweight form of RDF schema information described in terms of (extended) graph homomorphisms, which allows one to restructure RDF databases along schema mappings in a lightweight way, as well as construct the relational queries the algorithm applied as taught herein requires in a less verbose way.

In various embodiments, data is migrated from a relational database to an RDF database at least in part by evaluating a set of relational conjunctive (select-from-where) queries "in reverse" and then quantifying round-trip information change.

Figure 1:
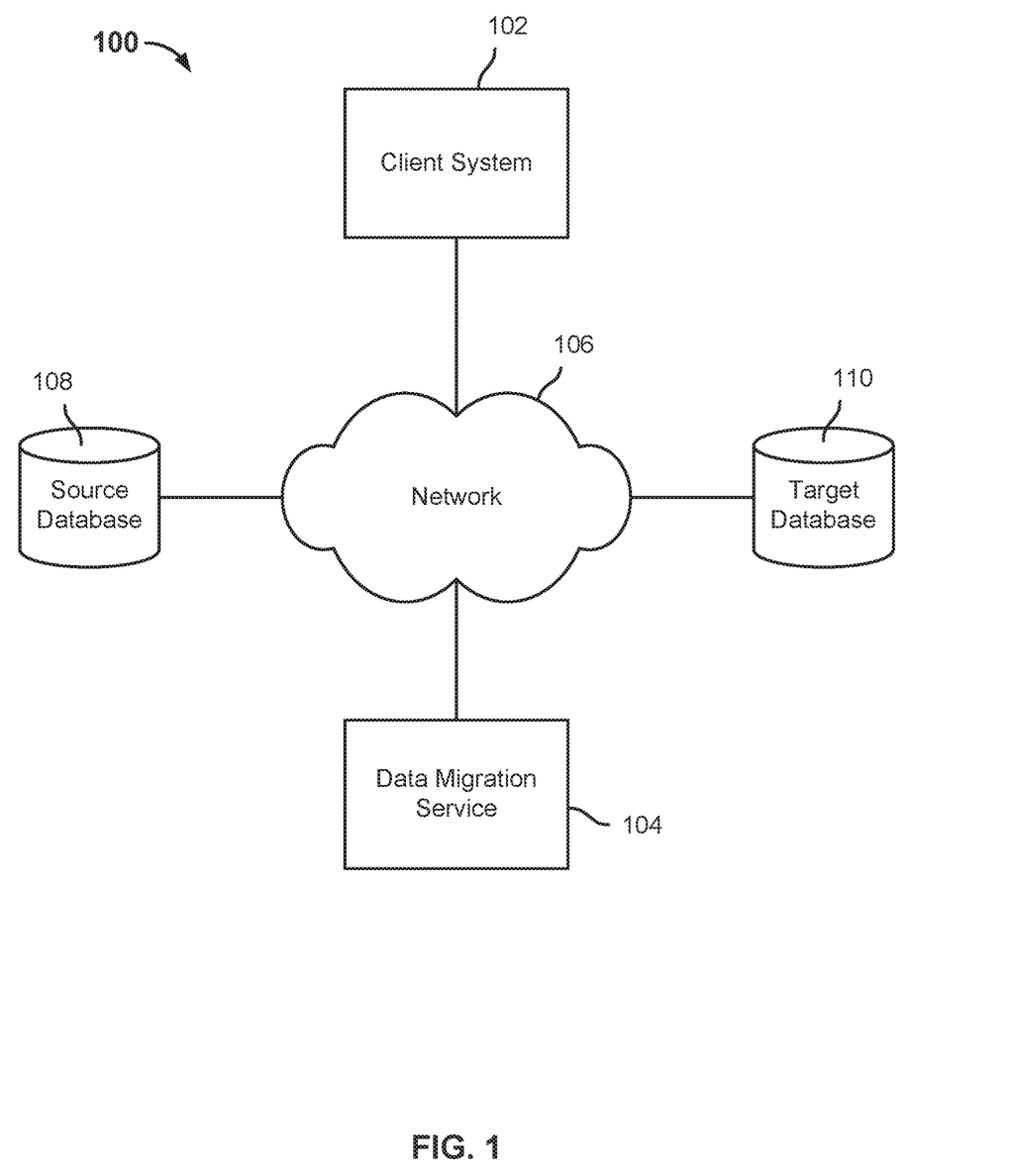
FIG. 1 is a block diagram illustrating an embodiment of a data migration system.

FIG. 1 is a block diagram illustrating an embodiment of a data migration system. In the example shown, system 100 includes a client system 102 configured to access a data migration service 104 via a network 106, such as the Internet. In various embodiments, client system 102 uses data migration service 104 to migrate data from a source database 108 to a target database 110. Client system 102 may provide a database identifier of one or both of a source database 108 and a target schema associated with target database 110. In addition, client system 102 provides, e.g., via a web-based or other user interface associated with data migration service 104, a set of one or more relational conjunctive (select/from/where) queries that specify(ies) how to populate a set of one or more tables comprising the source databased from data as (desired and anticipated to be) stored according to the target schema. The data migration service 104, in various embodiments, performs query co-evaluation using the received query(ies) and the source data to generate and store in the target database 110 a set of data that corresponds to the source data. In a sense, the query(ies) received from client system 102 is/are run in reverse, to migrate data from the source database 108 to the target database 110.

Figure 2:
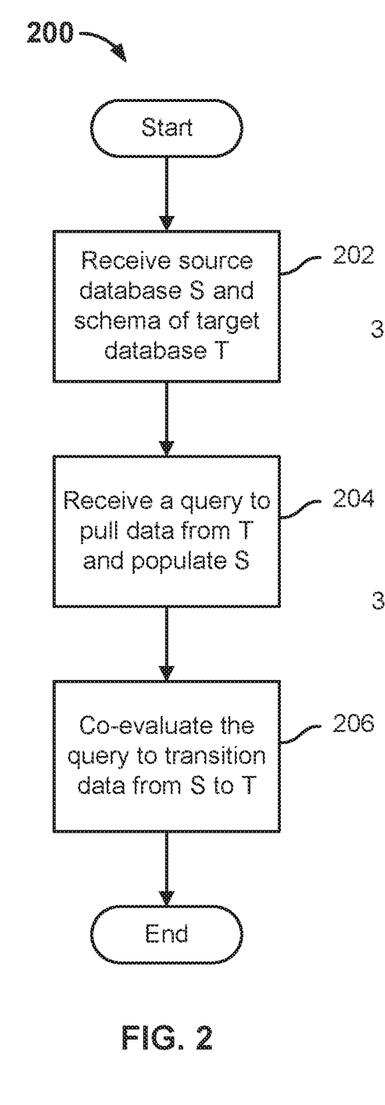
FIG. 2 is a flow diagram illustrating an embodiment of a process to migrate data through query co-evaluation.

FIG. 2 is a flow diagram illustrating an embodiment of a process to migrate data through query co-evaluation. In various embodiments, the process 200 of FIG. 2 is performed by a data migration service and/or system, such as data migration service 104 of FIG. 1. In the example shown, a source database S and a schema of a target database T are received at 202. A query to pull data from database T (once present) and populate tables of database S is received at 204. At 206, the query received at 206 is co-evaluated, as described more fully below, to transition data from database S to database T.

Figure 3:
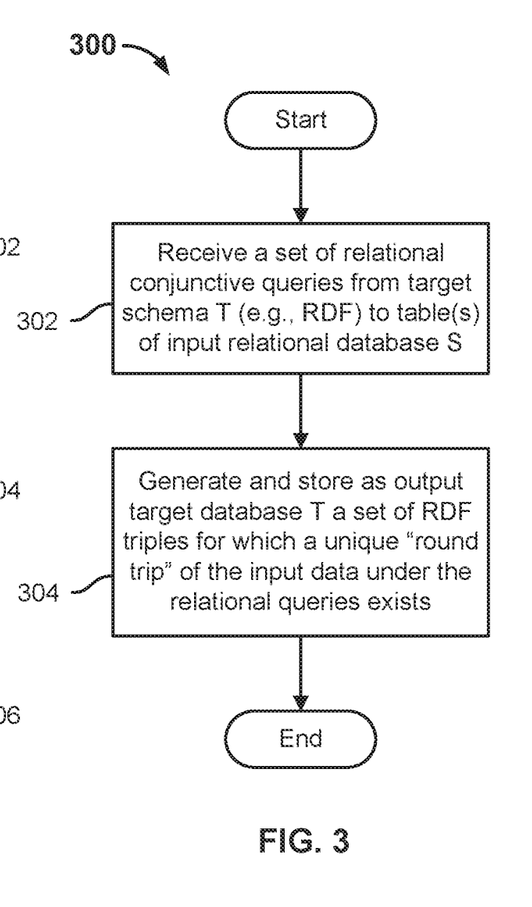
FIG. 3 is a flow diagram illustrating an embodiment of a process to migrate data from a relational database to an RDF schema through query co-evaluation.

FIG. 3 is a flow diagram illustrating an embodiment of a process to migrate data from a relational database to an RDF schema through query co-evaluation. In various embodiments, the process 300 of FIG. 3 is performed by a data migration service and/or system, such as data migration service 104 of FIG. 1. In the example shown, at 302 a set of relational conjunctive queries from target schema T (e.g., a target RDF schema) to table(s) of input relational database S is received. A set of RDF triples for which a unique "round trip" of the received input data under the received relational queries exists is generated and stored at 304.

Figure 4:
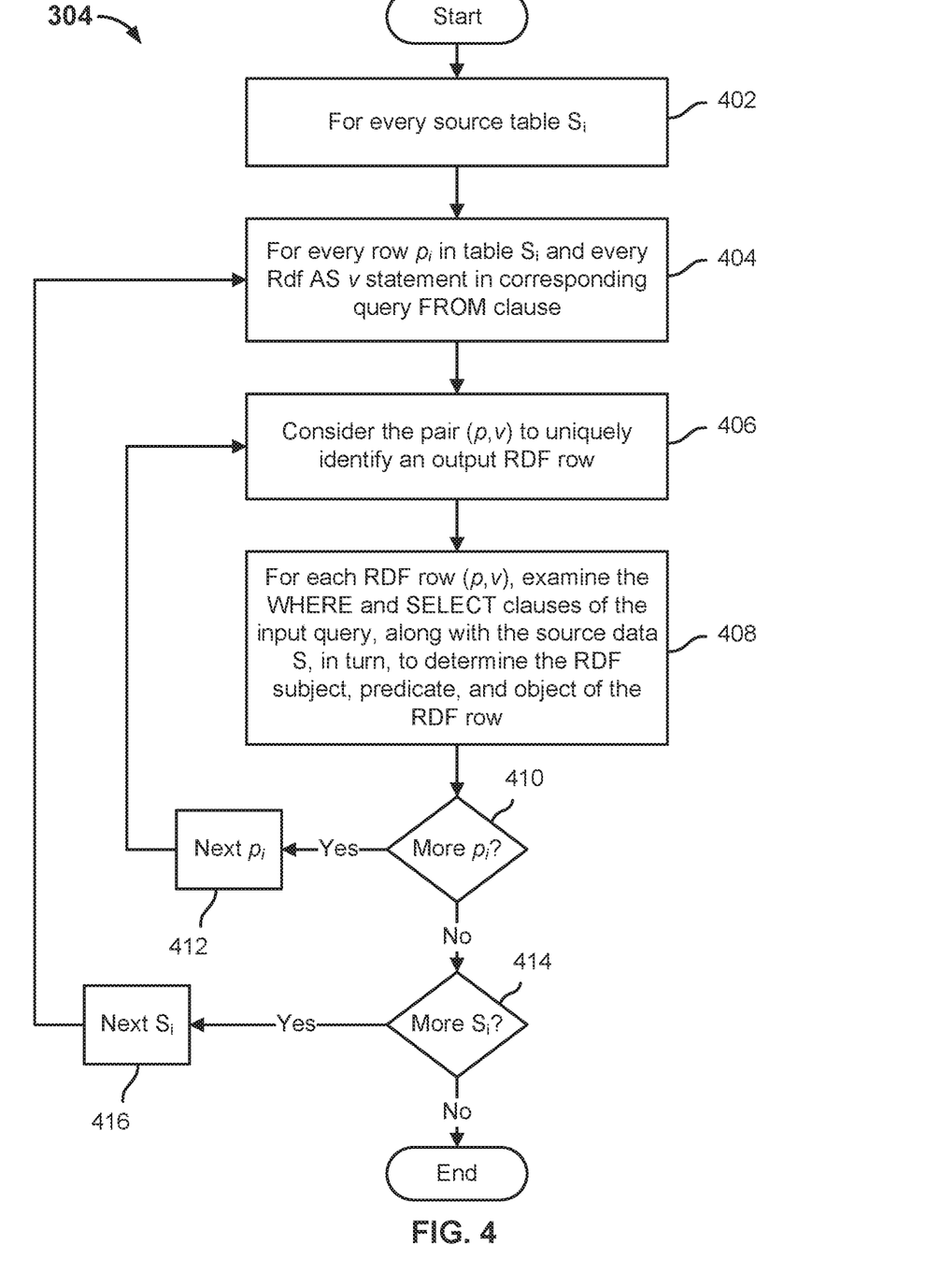
FIG. 4 is a flow diagram illustrating an embodiment of a process to migrate data from a relational database to an RDF schema through query co-evaluation.

FIG. 4 is a flow diagram illustrating an embodiment of a process to migrate data from a relational database to an RDF schema through query co-evaluation. In various embodiments, the process of FIG. 4 is performed to implement step 304 of the process 300 of FIG. 3. In the example shown, for every source table $S_j$ (402) and within each table for every row $p_i$ in that table $S_j$ and every "Rdf AS v" statement in the corresponding input query FROM clause (404), each pair (p, v) is considered to uniquely identify an output RDF row (406). For each such row (p, v), the WHERE and SELECT clauses of the input query are examined in turn, along with the relevant portions of the source data S, to determine the RDF subject, predicate, and object of that RDF row (408). Processing continues until all rows (410, 412) and tables (414, 416) have been processed.

Figure 5A:
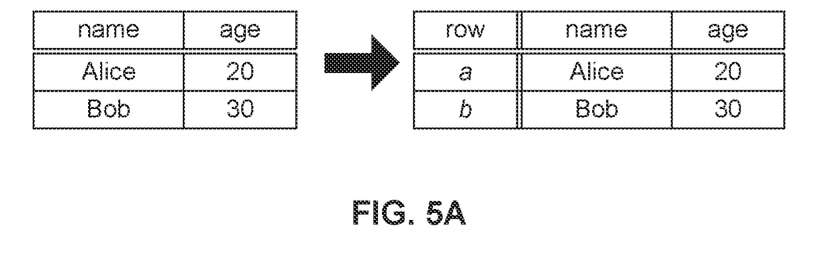
FIG. 5A shows an illustrative example of a relational database comprising as single source table.

FIG. 5A shows an illustrative example of a relational database comprising as single source table. In the example shown in FIG. 5A, the source relational database schema S consists of exactly one table, the table "Person" as shown on the left side of FIG. 5A, with columns named "name" and "age". In this example, we assume that the input relation for Person contains two rows, which we will refer to as a and b. In the example shown, a row column is added to the input table Person and new row identifiers (IDs) are created for each row. In various embodiments, the actual values of the row IDs do not matter/can be arbitrarily chosen. Stated another way, in the example shown in FIG. 5A processing as disclosed herein starts with the table on the left and creates the table on the right.

In the example shown in FIG. 5A, the input relational database consists of one table with the source schema Person(name, age). As a result, a single relational conjunctive (select/from/where) query that specifies how to populate Person from RDF triples must be provided. Assuming that the RDF database is as a three column table represented with target schema Rdf(subject,predicate,object), the name and age columns of table Person may be projected out as follows (where foaf is the "friend of a friend" RDF schema):

```
CREATE VIEW Person AS
SELECT r1.object AS name, r2.object AS age
FROM Rdf AS r, Rdf AS r1, Rdf AS r2
WHERE
    r.subject = r1.subject AND r1.predicate = "foaf:name" AND
    r.subject = r2.subject AND r2.predicate = "foaf:age" AND
    r.predicate = "rdfs:type" AND r.object = "foaf:person"
```

Note that the above choice of query is not (necessarily) unique. In fact, many choices of query are or may be possible, and in various embodiments techniques disclosed herein may be used to quantify the innate information change (gain or loss or neither) of each choice. If two queries are semantically equivalent, meaning they always given the same output when given the same input, then the results reported in Patrick Schultz and Ryan Wisnesky, Algebraic data integration, J. Funct. Program., 27:e24 (2017) ("Schultz and Wisnesky"), which is incorporated herein by reference for all purposes, imply that the output of our algorithm will be the same on both queries.

At a mathematical level, the source relational schema S (containing a single table, Person in this example) and target relational schema T (containing a single table, Rdf in this example, with schema Rdf (subject, predicate, object)) form algebraic structures called categories and the conjunctive relational queries from T to S is a pro-functor, which can not only be evaluated to transform T-databases into S-databases according to the usual relational (e.g. SQL) semantics, but also can be "co-evaluated", as disclosed herein, to turn S-databases into T-databases in the most data quality-preserving way possible. A definition of query co-evaluation in the most general case is described in Schultz and Wisnesky. An application of query co-evaluation is implemented in the open-source CQL tool available at http://categoricaldata.net.

Referring further to the example shown in FIG. 5A and the above example of a query to populate the Person table from RDF triples, in various embodiments data migration from the Person table to the destination RDF schema is performed via query co-evaluation as follows:

First, for every row p in Person and every Rdf AS v statement in the query FROM clause, i.e., Rdf AS r, Rdf AS r1, Rdf AS r2 in this example, the pair (p, v) is considered to uniquely identify an output RDF row. In this example, the above processing yields six output RDF tuples, which are referred to as:

$(a,r),(a,r_1),(a,r_2),(b,r),(b,r_1),(b,r_2)$

To determine the RDF subjects, predicates, and objects of these six output rows, the WHERE, FROM, and SELECT clauses of the input query(ies) is/are examined in turn, in various embodiments.

In this example, the following WHERE clause:
r.subject=r1.subject AND r1.predicate="foaf:name" AND r.subject=r2.subject AND r2.predicate="foaf:age" AND r.predicate="rdfs:type" AND r.object="foaf:person"

is applied to the output rows enumerated above, yielding the following equestions:

(a,r).subject=$(a,r_1)$.subject;$(a,r_1)$.predicate=foaf:name;(a, r).subject=(a,r2).subject; (a, $r_2$).predicate=foaf:age; (a, r).predicate=rdfs:type; (a, r).object=foaf:person; (a, r).subject=(b, $r_1$).subject; (a, $r_1$).predicate=foaf:name; (a, r).subject=(b, $r_2$).subject; (a, $r_2$).predicate=foaf:age; (a, r).predicate=rdfs:type; and (a, r).object=foaf:person The above equations contain redundancy, but as shown are not simplified (to eliminate the redundancy) to make it more apparent how they were computed.

To the equations above, equations about the attributes of the table Person are added from the input data:
a.name=Alice b.name=Bob a.age=20 b.age=30
and from the SELECT clause of the query, i.e., r1. object AS name, r2. object AS age, the following equations are added:
(a, $r_1$).object=a.name; (b,$r_1$).object=b.name; (a, $r_2$).object=a.age; (b, $r_2$).object=b.age Note that row identifiers, such as a, appear in both tuples (e.g., (a, $r_1$)) and alone (e.g., a.name).

Figure 5B:
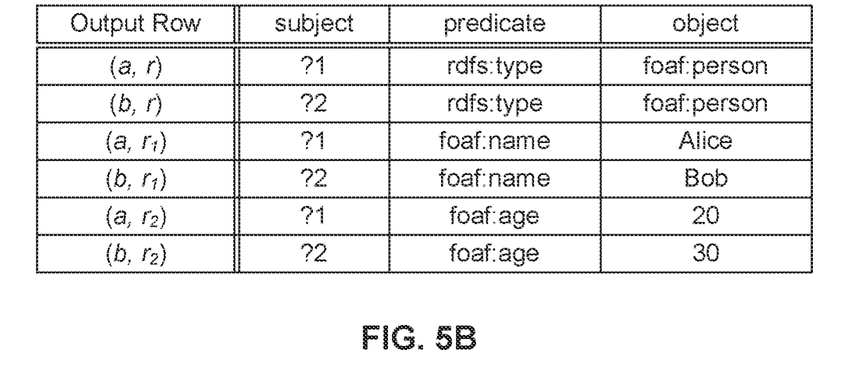
FIG. 5B shows an example of a set of RDF output rows generated via query co-evaluation in an embodiment of a data migration service.

FIG. 5B shows an example of a set of RDF output rows generated via query co-evaluation in an embodiment of a data migration service. Referring to the example above and FIG. 5B, in various embodiments the subjects, predicates, and objects for each output RDF row are determined by examining the equations from the steps above and creating the (uniquely determined) minimal number of new fresh values/RDF blank nodes (indicated by ?s) required to complete the table as shown in FIG. 5B.

The RDF tuples in the example shown in FIG. 5B contain two RDF Blank Nodes, ?1 and ?2, representing Alice and Bob, respectively. The table shown in FIG. 5B is constructed, in various embodiments, by repeatedly re-writing the equations from the above steps into a normal form, or constructing a decision procedure for the equations and then creating an initial term model, or using congruence closure algorithms, or other techniques. The RDF tuples shown in FIG. 5B can be exported directly as e.g. XML or Turtle (.ttl), or closed under RDFS or OWL axioms as desired, in various embodiments.

Figure 5C:
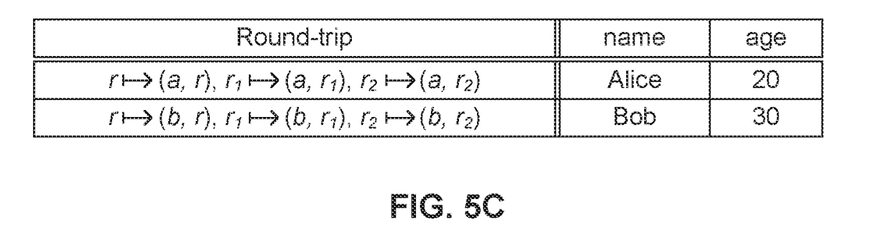
FIG. 5C shows an example of a round-trip of input data as computed in an embodiment of a data migration service.

FIG. 5C shows an example of a round-trip of input data as computed in an embodiment of a data migration service. In the example shown, the round-trip of the input data from the table Person is computed by applying the user queries to the triples as shown in FIG. 5B, resulting in two rows in this example, as shown in FIG. 5C.

Figure 5D:
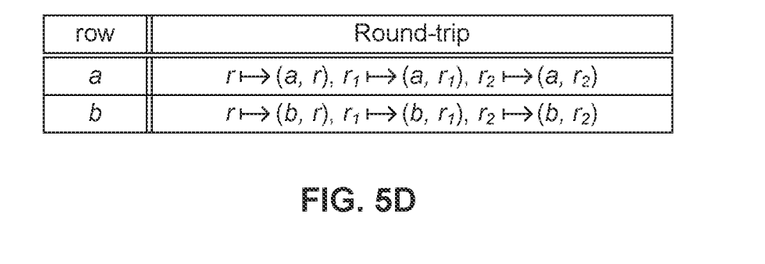
FIG. 5D shows an example, written as a table, of a unique function assigning the row IDs of the table of FIG. 5C to the row IDs of the original source data.

Referring to the input relational database as I, then it is a theorem (see Schultz and Wisnesky) that there is a unique function assigning the row IDs of the above table to the row IDs of the original source data I. FIG. 5D shows an example, written as a table, of a unique function assigning the row IDs of the table of FIG. 5C to the row IDs of the original source data. The function is injective because no target row is mapped to more than one source ID, and surjective, because every target row is mapped to by at least one source ID. It may thus be said that the unit (see Schultz and Wisnesky) of the relational-to-RDF data transformation defined herein is bijective on the Person table, and it can be concluded there is no information loss or gain, in this example.

While certain examples and embodiments described herein are concerned with RDF, techniques disclosed herein may be applied, in various embodiments, to any data model that can be expressed algebraically, which includes most graph data models.

In some embodiments in which data is migrated other than from a relational database to RDF, for every foreign key $R_i \rightarrow R_k$, a "homomorphism of queries" from $Q_k \rightarrow Q_i$ is received as input, from which it follows that "$Q_i(J) \subseteq Q_k(J)$" for every RDF instance J, as required to populate the foreign keys correctly. We use quotes because technically a "derived signature morphism" is required between the "algebraic theories" that are induced by the queries, a notion similar in spirit but not the same as the usual notion of homomorphism of conjunctive (select-from-where) queries, and which induces an ordering that is similar to subset containment. In many cases, a homomorphism of queries is simply a mapping of FROM-bound variables to FROM-bound variables that preserves WHERE-clause entailment. This additional information about how the relational queries should materialize foreign keys can be specified in the CQL tool, for example, and is described in Schultz and Wisnesky.

Note that because the three-column RDF schema is a relational schema, the results in this paper apply to RDF-to-RDF translation as well.

To minimize formalism, in the above examples single relational tables are loaded into RDF. In various embodiments, techniques disclosed herein are used to migrate relational databases having multiple input tables. To load a set of relational tables $R_0, \ldots, R_n$, a set of relational queries $Q_0: \text{Rdf} \rightarrow R_0, \ldots, Q_n: \text{Rdf} \rightarrow R_n$ are required and received as input.

The following paragraphs and figures illustrate applying techniques disclosed herein to a more elaborate example, of loading data into the Financial Industry Business Ontology (FIBO) ontology. The set of RDF triples defined below can be written down in .xml or .ttl form and loaded into a tool such as Protege™ that has been pre-populated with the FIBO ontology.

FIG. 6A illustrates a single row of input payer/payee data on a single table, as shown for example in the CQL tool.

FIG. 6B illustrates an example of a relational conjunctive (select-from-where) query to construct a set of RDF triples from FIBO.

FIG. 6C shows a set of RDF triples constructed from FIBO via query co-evaluation as disclosed herein. In the example shows, the set includes 24 RDF triples with 15 blank RDF nodes related as shown in FIG. 6C. Note that every symbol, for example US Dollar, that appears in the input row appears in the output. Note also that the blank nodes appear in multiple tuples, for example, subject ?0 has object ?13, which in turn is the subject of row 21.

FIG. 6D illustrates a result of round-tripping the data shown in FIG. 6A. In the example shown, there are two round-tripped rows corresponding to the single row of input shown in FIG. 6A. The round-trip assigns the single input row to the row with both US and Chinese currencies, but there is an additional row with two Chinese currencies, and no corresponding row with two US currencies. The presence of the additional row with two Chinese currencies and absence of a row with two US currencies are explained mathematically by examining the relational to RDF query. Although the query binds variables $r_1$ and $t_1$ for two "legs", and thus considers four possible leg-leg pairings, it only binds a single variable for an RDF triple with predicate hasEffective Date, thereby restricting to just to the pairs with $r_1$ as the left component (i.e., $(t_1, r_1)$ is not considered because the query is asymmetric, at the level of syntax). Further analysis reveals that there is no way to avoid considering all pairs of legs to round-trip because in this example there is no access to the CrossCurrencyInterestRateSwaps that describe which legs belong to the same swap. However, even if the two legs did originate from the same swap, because in FIBO each leg has only one owner, an input row with a different buyer and seller must create two separate legs. In other words, in FIBO, each leg has one owner, and in the input data as shown in FIG. 6A there is a two-legged swap; therefore, the initial row is expected to be round-tripped into two rows. As a result, it can be concluded that the round-trip reveals the loading process worked exactly as intended. As the above discussion demonstrates, the design of the relational conjunctive (select-from-where) queries input to a data migration service as disclosed herein can have subtle implications that depend on the schema of the RDF data; the analysis above depends on the meaning of the various FIBO predicates, for example. Fortunately, however, drawing the FIBO RDF schema as a graph can help guide the discussion.

Figure 7:
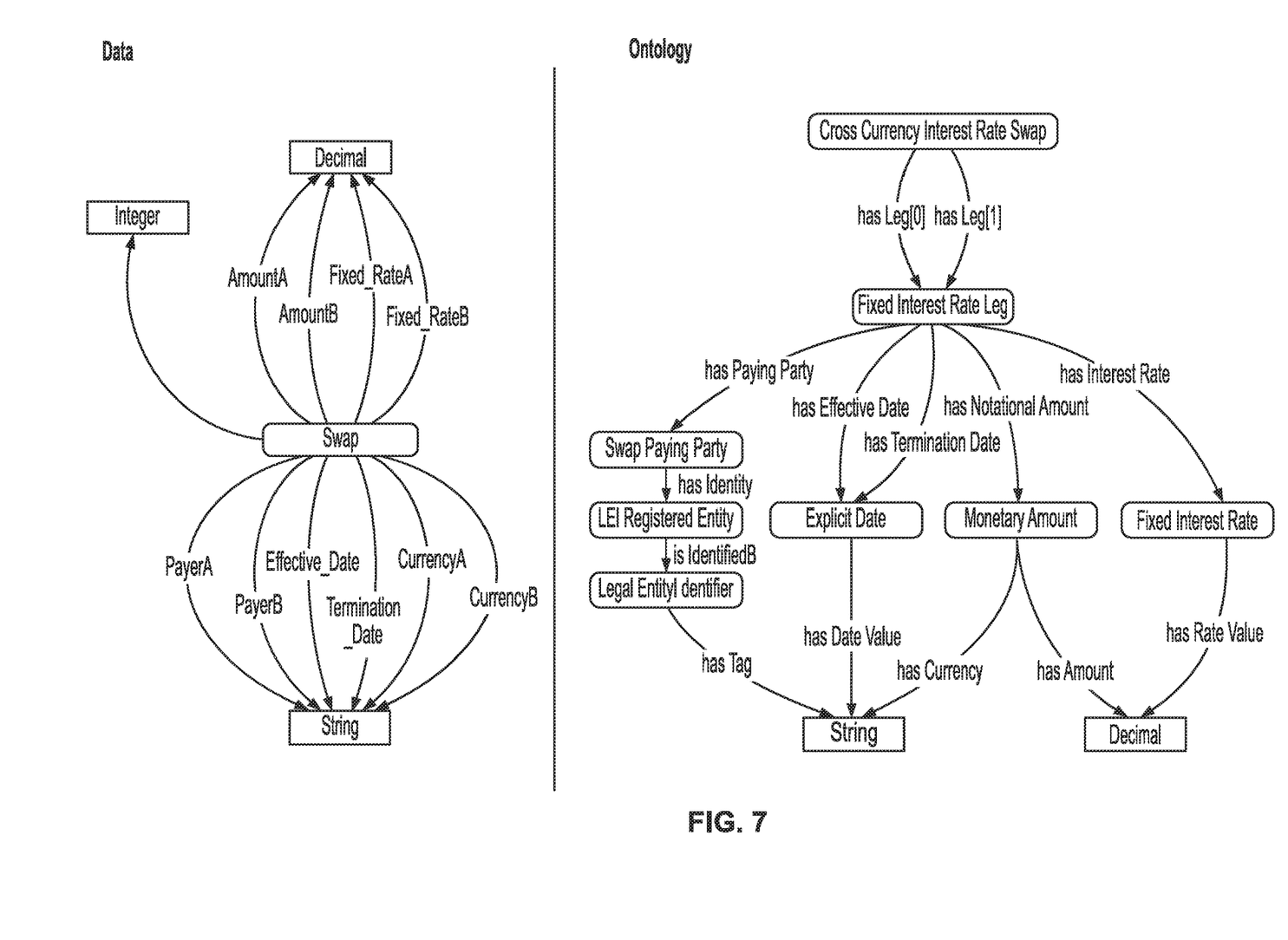
FIG. 7 illustrates an example of the FIBO RDF schema as a graph.

FIG. 7 illustrates an example of the FIBO RDF schema as a graph. In some embodiments, a notion of graph morphism is used to generate relational queries to be co-evaluated to perform data migration as disclosed herein. In the example shown, the graph on the left comprises a directed labelled multi-graph for the source data. This graph has a node for every data type, a node for every relational table, and a directed edge for every attribute and foreign key. The source relational data may thus be considered as a collection of sets and functions over this graph: to each node in the graph we associate the set of rows of the associated table, and to each edge we associate a column of the input data, considered as a function from the set of rows to the domain. Then, we define a directed labelled multi-graph for our RDF data. This graph has a node for every data type, a node for every class, and a directed edge for every predicate. An RDF database may thus be considered as a collection of sets and relations over this graph: to each node in the graph we associate the set of instances of the associated class, and to each edge we associate a binary relation over the universal RDF domain. That is, on this example the two graphs shown in FIG. 7 are created, where the left graph for the source data has edges that mean 'function' and the right graph for the target data has edges that mean 'relation'.

That the edges on the left graph and right graph of FIG. 7 have a different meaning is something that a data migration service/system as disclosed herein mediates, in various embodiments. In some embodiments, a schema mapping from the left graph to the right graph is defined to be a function F from source nodes (e.g., relational tables) to target nodes (e.g., RDF classes) and a function F' from source edges (individual columns in the relational source) to paths of target edges (binary relations over the RDF domain) such that each source edge e:s→t is assigned to a path F'(e):F(s)→F(t).

Figure 8:
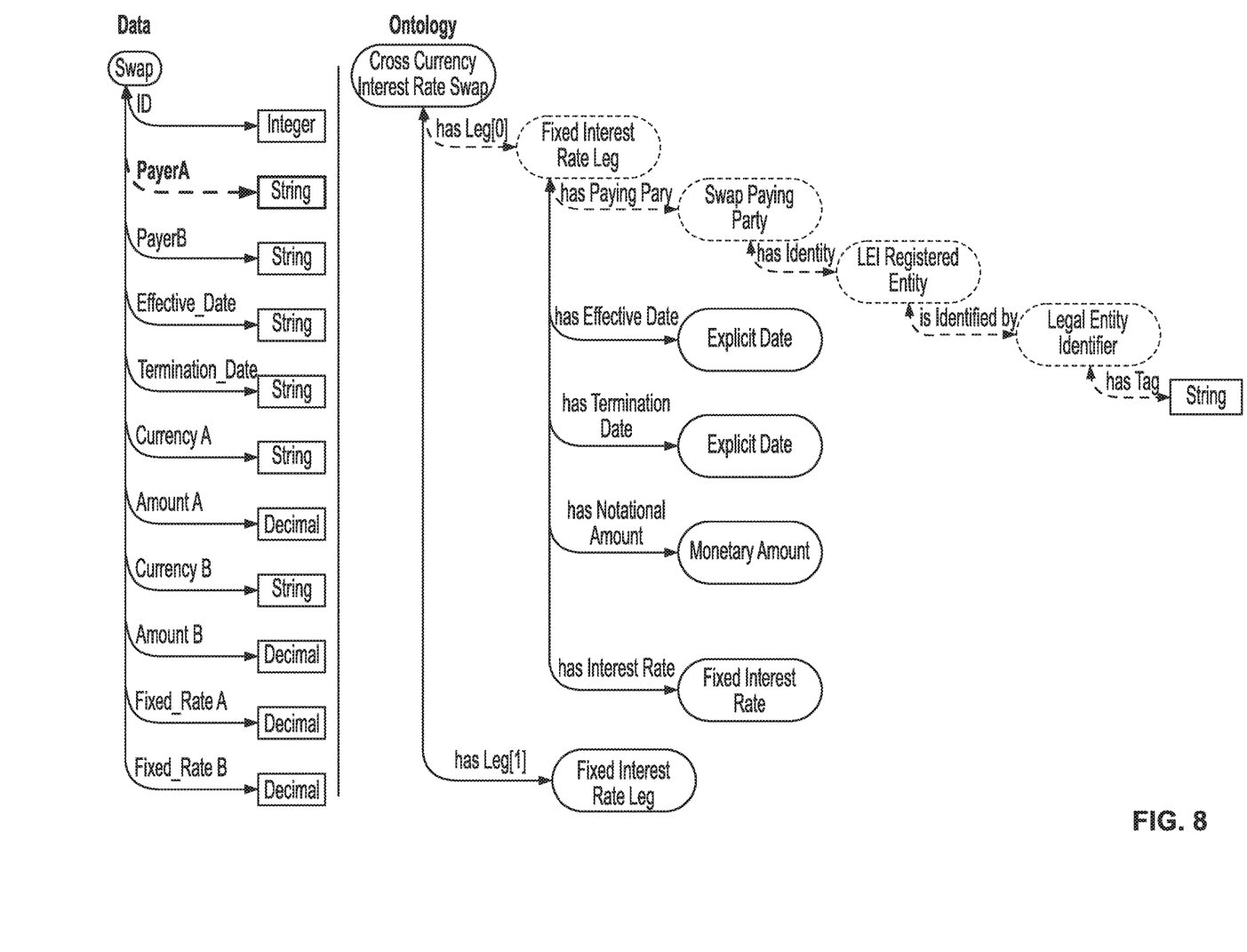
FIG. 8 illustrates a schema mapping from the left graph to the right graph of FIG. 7.

FIG. 8 illustrates a schema mapping from the left graph to the right graph of FIG. 7.

In various embodiments, a schema mapping as described above (e.g., FIGS. 7 and 8) is converted into a set of relational conjunctive (select-from-where) queries to be co-evaluated for data migration, as disclosed herein. FIGS. 9A through 9D show examples of relational conjunctive queries determined based at least in part on a schema mapping, such as a mapping as shown in FIGS. 7 and 8. The process of conversion proceeds source table by source table, in various embodiments, and starts by identifying the RDF class to be loaded from the table. For example, if the source table is Swap, the target RDF class may be identified as CrossCurrencyInterestRateSwa p and begin with the query fragment shown in FIG. 9A.

Figure 9A:
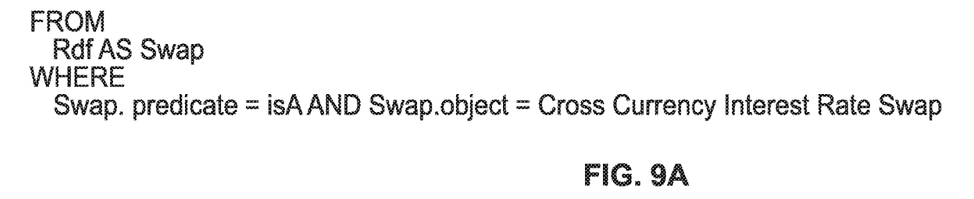
FIGS. 9A through 9D show examples of relational conjunctive queries determined based at least in part on a schema mapping, such as a mapping as shown in FIGS. 7 and 8.
Figure 9B:
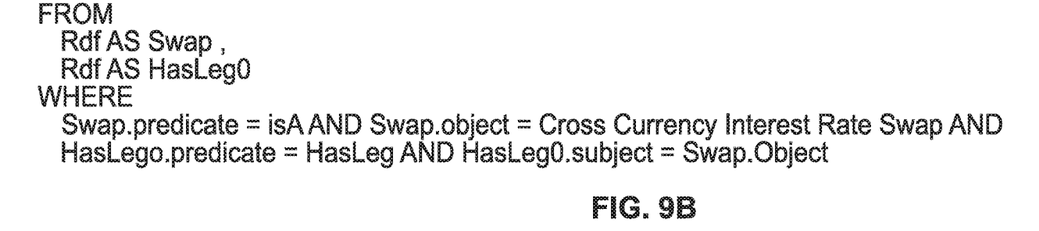
Figure 9C:
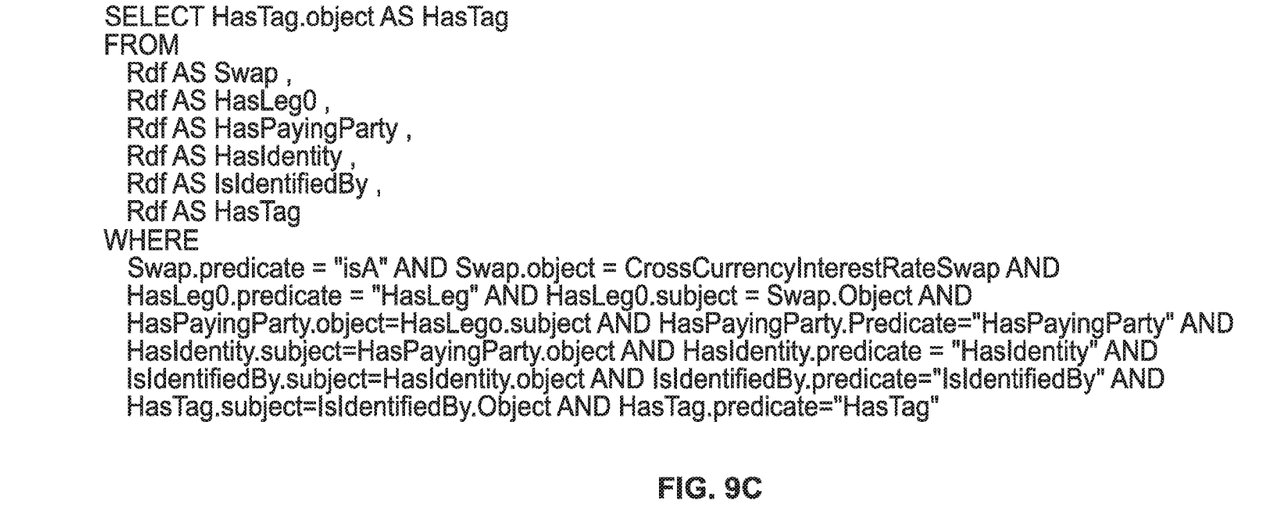
Figure 9D:
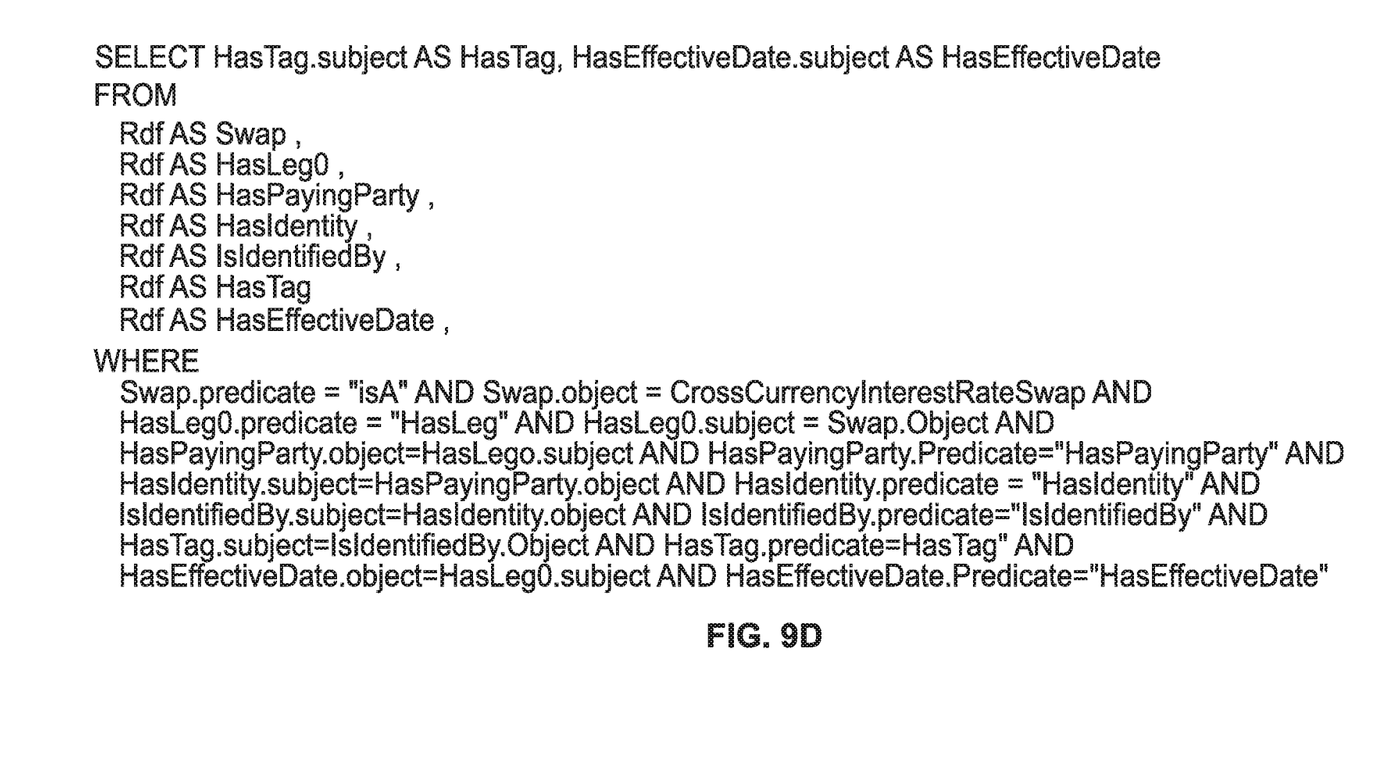

Each column of Swap, say PayerA, is associated with a path through the RDF schema which starts at Swap. Similarly, each edge in the RDF schema is associated with an RDF predicate, so the associated relational query may be considered, and that query may be post-composed with the query we started with, repeating until we've run out of edges. For example, after adding hasLeg[0] to the path for PayerA the (partial) query as shown in FIG. 9B is obtained. Continuing the process, where we project the column name we are interested in, in this example PayerA), we finally arrive at the partial query as shown in FIG. 9C. Finally, because each column to be mapped belongs to the same RDF class (Swap, in this example), the above process can be repeated for the other columns, such as HasEffectiveDate, and the resulting queries merged, achieving a resulting query as shown in FIG. 9D. After repeating for all columns, we arrive at the query shown in FIG. 6B.

Techniques have been disclosed to translate relational databases to RDF triples, for example, by "co-evaluating" a set of relational conjunctive (select-from-where) queries that specify how to "round-trip" the relational data in "the best way possible". Techniques have been disclosed to quantify the information change (loss or gain) of this approach by examining the induced round-trips on the input data. Because the queries required as input to a data migration system/service as disclosed herein can be verbose, a schema mapping language to abbreviate such queries has been disclosed and a graph-based representation has been described that can be used to construct such queries through an entirely graphical user interface. Finally, an example applying techniques disclosed herein to load Cross Currency Interest Rate swaps into the FIBO RDF/OWL ontology has been described.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a communication interface; and
   a processor coupled to the communication interface and configured to:
      receive via the communication interface an input data comprising (1) a source database S and (2) a target schema T to which data from source database S is to be migrated;
      receive via the communication interface, prior to migrating data from source database S to a target database stored according to target schema T, a set of relational conjunctive queries that specify how to populate a set of one or more tables comprising the source database S from data stored according to the target schema T; and
      perform query co-evaluation on the received set of relational conjunctive queries to transition data from source database S to the target database stored according to target schema T;

wherein the source database S includes a plurality of data rows and performing the query co-evaluation includes determining, for each data row in a least a subset of the plurality of data rows, a corresponding data to be included in the target database stored according to target schema T such that application of relevant portions of the received set of relational conjunctive queries to the corresponding data would return that data row of the source database S.

2. The system of claim 1, wherein the source database S comprises a relational database.

3. The system of claim 2, wherein the target schema T comprises a Resource Description Framework (RDF) schema and the processor is configured to generate and store via query co-evaluation a set of RDF triples for which a unique round-trip of the input data under the received relational conjunctive queries exists.

4. The system of claim 3, wherein the source database S comprises a single table and the received set of relational conjunctive queries comprises a single query.

5. The system of claim 3, wherein the processor is configured to perform query co-evaluation at least in part by performing the following with respect to every row $p_i$ in a table S$i$ of source database S and for every "Rdf AS v" statement in the corresponding input query FROM clause:
consider the pair (p,v) to uniquely identify an output RDF row; and
for each RDF row (p,v), examine the WHERE and SELECT clauses of the input query, in turn, along with the source data S, to determine the RDF subject, predicate, and object of the RDF row.

6. The system of claim 3, wherein the generated RDF triples include on or more RDF Blank Nodes.

7. The system of claim 3, wherein the source database S includes a plurality of relational tables $R_0, \ldots, R_n$; the received set of relational conjunctive queries includes queries $Q_0$: Rdf→$R_0$, ..., Qn : Rdf→$R_n$.

8. The system of claim 1, wherein the processor is further configured to quantify data loss or gain at least in part by computing a round-trip of the input data under the received set of relational conjunctive queries.

9. A method, comprising:
receiving an input data comprising (1) a source database S and (2) a target schema T to which data from source database S is to be migrated;
receiving, prior to migrating data from source database S to a target database stored according to target schema T, a set of relational conjunctive queries that specify how to populate a set of one or more tables comprising the source database S from data stored according to the target schema T; and
performing, by a processor, query co-evaluation on the received set of relational conjunctive queries to transition data from source database S to the target database stored according to target schema T;
wherein the source database S includes a plurality of data rows and performing the query co-evaluation includes determining, for each data row in a least a subset of the plurality of data rows, a corresponding data to be included in the target database stored according to target schema T such that application of relevant portions of the received set of relational conjunctive queries to the corresponding data would return that data row of the source database S.

10. The method of claim 9, wherein the source database S comprises a relational database.

11. The method of claim 10, wherein the target schema T comprises a Resource Description Framework (RDF) schema and the method further includes generating and storing via query co-evaluation a set of RDF triples for which a unique round-trip of the input data under the received relational conjunctive queries exists.

12. The method of claim 11, wherein the source database S comprises a single table and the received set of relational conjunctive queries comprises a single query.

13. The method of claim 11, wherein the processor is configured to perform query co-evaluation at least in part by performing the following with respect to every row $p_i$ in a table $S_i$ of source database S and for every "Rdf AS v" statement in the corresponding input query FROM clause:
consider the pair (p,v) to uniquely identify an output RDF row; and
for each RDF row (p,v), examine the WHERE and SELECT clauses of the input query, in turn, along with the source data S, to determine the RDF subject, predicate, and object of the RDF row.

14. The method of claim 11, wherein the source database S includes a plurality of relational tables $R_0, \ldots, R_n$; the received set of relational conjunctive queries includes queries $Q_0$: Rdf→$R_0$, ..., $Q_n$: Rdf→$R_n$.

15. The method of claim 9, wherein the processor is further configured to quantify data loss or gain at least in part by computing a round-trip of the input data under the received set of relational conjunctive queries.

16. A computer program product embodied in a non-transitory computer readable medium and comprising computer instructions for:
receiving an input data comprising (1) a source database S and (2) a target schema T to which data from source database Sis to be migrated;
receiving, prior to migrating data from source database S to a target database stored according to target schema T, a set of relational conjunctive queries that specify how to populate a set of one or more tables comprising the source database S from data stored according to the target schema T; and
performing, by a processor, query co-evaluation on the received set of relational conjunctive queries to transition data from source database S to target database stored according to target schema T;
wherein the source database S includes a plurality of data rows and performing the query co-evaluation includes determining, for each data row in a least a subset of the plurality of data rows, a corresponding data to be included in the target database stored according to target schema T such that application of relevant portions of the received set of relational conjunctive queries to the corresponding data would return that data row of the source database S.

17. The computer program product of claim 16, wherein the source database S comprises a relational database.

18. The computer program product of claim 17, wherein the target schema T comprises a Resource Description Framework (RDF) schema and the method further includes generating and storing via query co-evaluation a set of RDF triples for which a unique round-trip of the input data under the received relational conjunctive queries exists.

19. The computer program product of claim 18, wherein the source database S comprises a single table and the received set of relational conjunctive queries comprises a single query.

20. The computer program product of claim 18, wherein the processor is configured to perform query co-evaluation at least in part by performing the following with respect to every row $p_i$ in a table $S_i$ of source database S and for every "Rdf AS v" statement in the corresponding input query FROM clause:

consider the pair (p,v) to uniquely identify an output RDF row; and for each RDF row (p,v), examine the WHERE and SELECT clauses of the input query, in turn, along with the source data S, to determine the RDF subject, predicate, and object of the RDF row.

* * * * *